(12) United States Patent
Gu

(10) Patent No.: US 11,503,895 B2
(45) Date of Patent: Nov. 22, 2022

(54) MAKEUP REMOVAL MASK

(71) Applicant: L'Oreal, Paris (FR)

(72) Inventor: Jialu Gu, Leonia, NJ (US)

(73) Assignee: L'OREAL, Paris (FR)

( * ) Notice: Subject to any disclaimer, the term of this patent is extended or adjusted under 35 U.S.C. 154(b) by 3 days.

(21) Appl. No.: 15/849,348

(22) Filed: Dec. 20, 2017

(65) Prior Publication Data

US 2019/0183229 A1 Jun. 20, 2019

(51) Int. Cl.
*A45D 34/04* (2006.01)
*B08B 1/00* (2006.01)
*B08B 3/08* (2006.01)
*B32B 9/02* (2006.01)
*A45D 40/30* (2006.01)

(52) U.S. Cl.
CPC .............. *A45D 34/04* (2013.01); *A45D 40/30* (2013.01); *B08B 1/001* (2013.01); *B08B 3/08* (2013.01); *B32B 9/02* (2013.01); *A45D 2200/1027* (2013.01); *A45D 2200/1036* (2013.01); *A45D 2200/1063* (2013.01); *B32B 2555/00* (2013.01)

(58) Field of Classification Search
CPC ............ A45D 34/04; A45D 2200/1063; A45D 2200/1027; B32B 9/02; B32B 2555/00; B08B 3/08; B08B 1/001; A47K 10/00; A61M 35/00; A61M 35/10
USPC ...... 134/6; 15/104.001, 104.022, 208, 209.1, 15/210.1, 227; 604/289, 290, 303, 304
See application file for complete search history.

(56) References Cited

U.S. PATENT DOCUMENTS

| | | | | |
|---|---|---|---|---|
| 3,472,242 A | * | 10/1969 | Demner | A61Q 19/10 132/333 |
| 4,884,719 A | * | 12/1989 | Levine | B65D 83/0847 221/25 |
| 5,041,317 A | * | 8/1991 | Greyvenstein | B65D 33/002 428/35.5 |
| 5,137,040 A | * | 8/1992 | Iosilevich | A45D 33/00 132/218 |
| 5,198,276 A | * | 3/1993 | Nakajima | B65D 75/5805 428/43 |
| 5,649,336 A | * | 7/1997 | Finch | A47K 10/42 15/104.94 |
| D424,740 S | * | 5/2000 | Ono | D28/4 |

(Continued)

FOREIGN PATENT DOCUMENTS

| EP | 2811858 A1 | 12/2014 |
|---|---|---|
| EP | 3090725 A1 | 11/2016 |

(Continued)

*Primary Examiner* — Duy Vu N Deo
*Assistant Examiner* — Christopher Remavege
(74) *Attorney, Agent, or Firm* — Christensen O'Connor Johnson Kindness PLLC

(57) ABSTRACT

A makeup remover mask includes a first sheet of an absorbent material having a periphery with a concave section; and a second sheet of an absorbent material having a periphery with a convex section. The makeup remover mask is used for removing eye makeup by placing the first sheet of an absorbent material having a periphery with a concave section on a lower eye lid of an eye beneath eyelashes, and placing a second sheet of an absorbent material having a periphery with a convex section on an upper eye lid of an eye, wherein the second sheet covers the eye makeup to be removed.

5 Claims, 7 Drawing Sheets

(56) References Cited

U.S. PATENT DOCUMENTS

| | | | | |
|---|---|---|---|---|
| 6,530,379 | B2* | 3/2003 | Iosilevich | A45D 40/30 132/319 |
| 6,601,591 | B1* | 8/2003 | Carullo | A45D 40/00 132/320 |
| 7,488,697 | B2* | 2/2009 | Louis Dit Picard | D04H 1/425 15/208 |
| 7,870,633 | B2* | 1/2011 | Thiebaut | A45D 34/04 15/209.1 |
| 8,283,013 | B2* | 10/2012 | Feldmann | B26F 1/22 162/114 |
| 8,287,977 | B2* | 10/2012 | McNeil | A47K 10/16 162/114 |
| 8,464,733 | B2* | 6/2013 | Franklin | A45D 40/30 132/319 |
| 8,561,622 | B1* | 10/2013 | Sanchez | A45D 44/12 132/319 |
| 9,173,472 | B2* | 11/2015 | Forsythe | A45D 40/30 |
| D770,092 | S* | 10/2016 | Lim | D28/7 |
| 9,918,595 | B2* | 3/2018 | Olson | D21H 25/005 |
| D849,998 | S* | 5/2019 | Lim | D28/7 |
| 10,422,083 | B2* | 9/2019 | Baum | D21H 27/40 |
| 10,689,810 | B2* | 6/2020 | Baum | D21H 27/005 |
| 2002/0155246 | A1* | 10/2002 | Johnson | A47K 10/38 428/43 |
| 2004/0019336 | A1* | 1/2004 | Temple | A45D 44/00 604/294 |
| 2005/0227563 | A1* | 10/2005 | Bond | D01D 5/082 442/334 |
| 2005/0257805 | A1* | 11/2005 | Williams | A45D 40/26 132/320 |
| 2006/0162735 | A1 | 7/2006 | Thiebaut | |
| 2007/0228064 | A1* | 10/2007 | Brennan | A47K 10/421 221/45 |
| 2009/0276971 | A1 | 11/2009 | Nozari | |
| 2009/0280150 | A1* | 11/2009 | Kamen | A45D 44/005 382/128 |
| 2011/0131742 | A1* | 6/2011 | Cheung | A47L 23/10 15/210.1 |
| 2011/0311750 | A1* | 12/2011 | McNeil | B26F 1/24 428/43 |
| 2011/0311751 | A1* | 12/2011 | Feldmann | B26F 1/24 428/43 |
| 2013/0172829 | A1* | 7/2013 | Badawi | A61F 9/0008 604/294 |
| 2013/0198989 | A1* | 8/2013 | Jemsby | A45D 40/00 15/210.1 |
| 2013/0232710 | A1* | 9/2013 | Policicchio | A47L 11/38 15/209.1 |
| 2014/0370224 | A1* | 12/2014 | Kien | B26F 1/14 428/43 |
| 2015/0044410 | A1* | 2/2015 | Kim | A61Q 1/10 428/41.8 |
| 2015/0359400 | A1* | 12/2015 | Kasahara | A45D 34/04 15/209.1 |
| 2016/0051033 | A1* | 2/2016 | Abraham | A45D 40/30 132/200 |
| 2018/0027949 | A1* | 2/2018 | George | A45D 40/30 |
| 2019/0029397 | A1* | 1/2019 | Huebner | A61M 35/006 |

FOREIGN PATENT DOCUMENTS

| | | | | |
|---|---|---|---|---|
| FR | | 2942399 A1 | 8/2010 | |
| GB | | 2489737 A | * 10/2012 | A47K 10/16 |

* cited by examiner

MAKEUP REMOVAL MASK

SUMMARY

In an embodiment, the eye makeup remover mask provides a clean makeup removing experience by not allowing transfer of makeup, such as mascara, eye shadow, eye liner, to the area under the eye. In an embodiment the eye makeup remover mask reduces the number of steps and effort (rubbing) needed for efficient and effective makeup removal. In an embodiment, the makeup remover mask uses a first and second sheet, one sheet is placed below the eye, and the second sheet is placed above the eye generally to cover the eyelid and the makeup to be removed. The sheet placed above the eye has a convex section, and the sheet placed below the eye has a concave section.

In an embodiment, a makeup remover mask comprises a first sheet of an absorbent material having a periphery with a concave section; and a second sheet of an absorbent material having a periphery with a convex section.

In an embodiment, the absorbent material comprises cotton, cellulose, wood pulp, or a combination thereof.

In an embodiment, the first sheet of an absorbent material and the second sheet of an absorbent material are not physically connected to each other.

In an embodiment, the periphery of the first sheet of an absorbent material further includes a concave or a convex section, and the periphery of the second sheet of an absorbent material further includes a concave or a convex section.

In an embodiment, the convex section is defined by a first radius located inside of the periphery of the second sheet of an absorbent material, and the concave section is defined by a second radius located outside of the periphery of the first sheet of an absorbent material.

In an embodiment, the first radius varies in length to the convex section, and the second radius varies in length to the concave section.

In an embodiment, the concave section is shaped corresponding to a lower eye shape, and the convex section is shaped corresponding to an upper eye shape.

In an embodiment, the first sheet of an absorbent material and the second sheet of an absorbent material are wetted with a solvent.

In an embodiment, the first sheet of an absorbent material and the second sheet of an absorbent material are single-ply or double-ply sheets.

In an embodiment, the periphery of the first sheet of an absorbent material includes at least three straight edges, and the periphery of the second sheet of an absorbent material includes at least three straight edges.

In an embodiment, the first and second sheet have the same periphery shape.

In an embodiment, a container comprises multiple pairs of a first sheet of an absorbent material having a periphery with a concave section and a second sheet of an absorbent material having a periphery with a convex section, and the first sheet alternates with the second sheet.

In an embodiment, the container further comprises a makeup remover solvent absorbed on the first and second sheets.

In an embodiment, the first sheet has a different entire periphery shape than the second sheet.

In an embodiment, the second sheet has a same entire periphery shape with the second sheet.

In an embodiment, the first sheet is joined to the second sheet at a line including perforations, a bend of material, or a thinning of material.

In an embodiment, a method for removing eye makeup, comprises placing a first sheet of an absorbent material having a periphery with a concave section on a lower eye lid of an eye beneath eyelashes; placing a second sheet of an absorbent material having a periphery with a convex section on an upper eye lid of an eye, wherein the second sheet covers the eye makeup.

In an embodiment, the concave section of the first sheet is placed facing the eye, and the convex section of the second sheet is placed facing the eye.

In an embodiment, placing the second sheet follows after placing the first sheet.

In an embodiment, the second sheet is wetted with an eye makeup remover solvent.

In an embodiment, the method further comprises rubbing the second sheet against the eye makeup.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In an embodiment, a makeup remover mask includes a first sheet made from an absorbent material and a second sheet made from an absorbent material, wherein the first sheet has an outer periphery that includes a concave section, and the second sheet has an outer periphery that includes a convex section. In an embodiment, the first and the second sheet define a piece of absorbent material wherein both the length and width of the material are greater than the thickness of the material. In an embodiment, both the length and width of a sheet of absorbent material is about 10 to 1,000 times greater than the thickness, for example. In an embodiment, both the length and the width of any sheet of absorbent material is from about 1 to 2 inches. The measurements of the length, width, and thickness provided herein are intended as a guide, and are not meant to be limiting. In an embodiment, as used herein, "periphery" means the outer edge of the sheet of the width and the length dimensions.

A makeup remover mask includes a sheet having a periphery with a convex section and a sheet having a periphery with a concave section. In an embodiment, the two sheets are physically separate. In an embodiment, the sheets can be joined initially and then optionally separated prior to use.

Figure 1A:
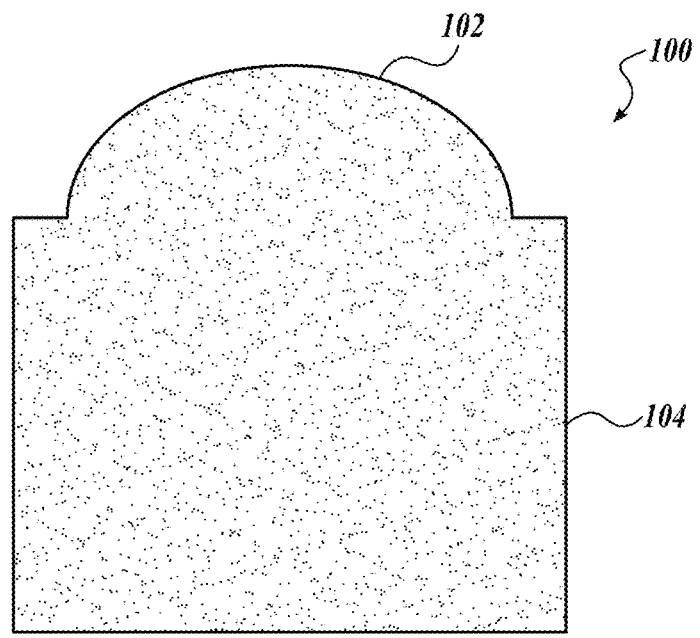
FIG. 1A is a diagrammatical illustration of one embodiment of a sheet of an absorbent material for a makeup remover mask.
Figure 1B:
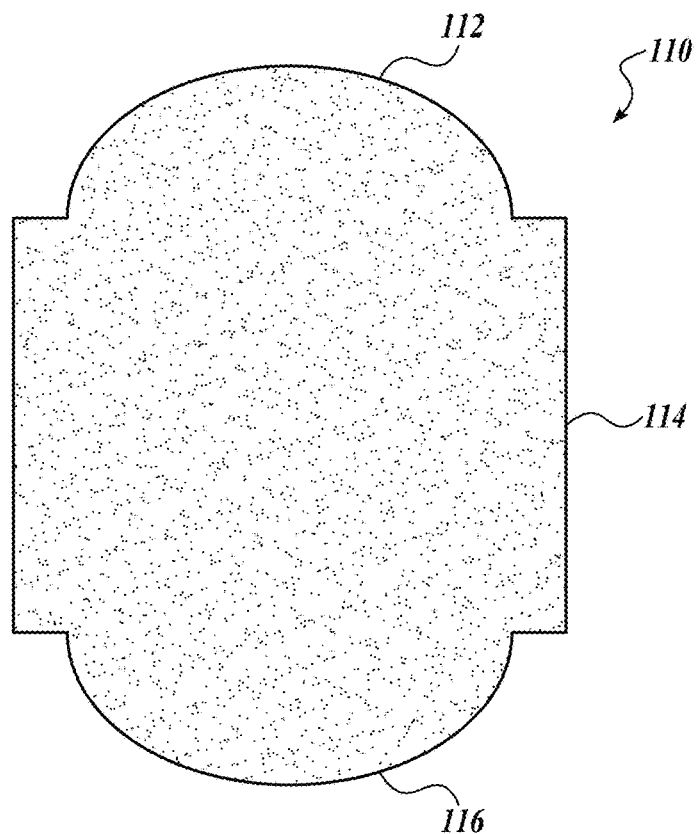
FIG. 1B is a diagrammatical illustration of one embodiment of a sheet of an absorbent material for a makeup remover mask.

FIGS. 1A and 1B are representative examples of one of the two sheets of absorbent material for the makeup remover mask. FIGS. 1A and 1B show representative examples of a sheet of absorbent material having a periphery with a convex section.

Referring to FIG. 1A, a sheet 100 of an absorbent material for one component of the makeup remover mask is illustrated. The sheet 100 of an absorbent material has a width and length greater than the thickness, so as to be easy flexible. The sheet 100 of an absorbent material has a periphery 104 including a convex section 102. The periphery of the sheet 100 of an absorbent material that is not part of the convex section 102 can assume any shape. In an embodiment, the periphery of the sheet 100 of an absorbent material that is not part of the convex section 102 has straight edges, thus, defining a part of a rectangle. In other embodiments, the periphery of the sheet 100 of an absorbent material that is not part of the convex section 102 can assume other shapes, including multiple straight edges and curves. In an embodiment, the periphery of the sheet 100 of an absorbent material that is not part of the convex section 102 is not limiting.

Referring to FIG. 1B, a sheet 110 of an absorbent material for one component of the makeup remover mask is illustrated. The sheet 110 of an absorbent material has a width and length greater than the thickness, so as to be easy flexible. The sheet 110 of an absorbent material has a periphery 114 including a first convex section 112 and a second convex section 116 that is located on the opposite side from the first convex section 112. Having two convex sections 112 and 116 allows the sheet 110 to be used multiple times, for example, twice as much as a sheet only having one convex section. The periphery of the sheet 110 of an absorbent material that is not part of the convex sections 112 and 116 can assume any shape. In an embodiment, the periphery of the sheet 110 of an absorbent material that is not part of the convex sections 112 and 116 has straight edges, thus, defining a part of a rectangle. In other embodiments, the periphery of the sheet 110 of an absorbent material that is not part of the convex sections 112 and 116 can assume other shapes, including multiple straight edges and curves. In an embodiment, the periphery of the sheet 110 of an absorbent material that is not part of the convex sections 112 and 116 is not limiting.

Figure 2A:
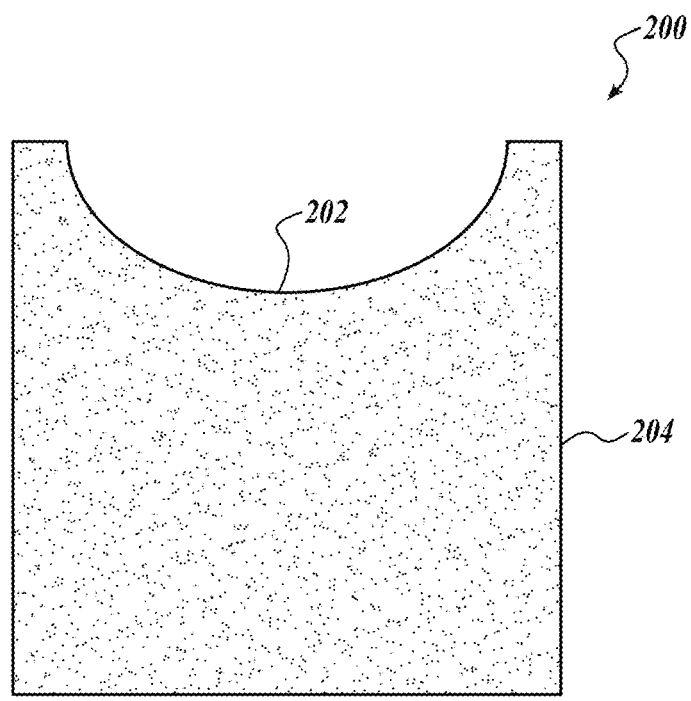
FIG. 2A is a diagrammatical illustration of one embodiment of a sheet of an absorbent material for a makeup remover mask.
Figure 2B:
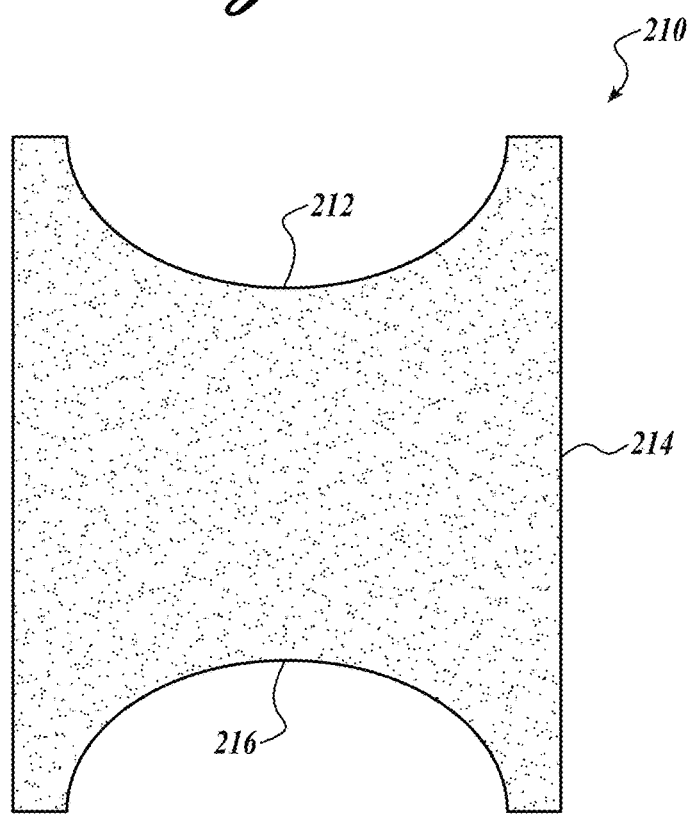
FIG. 2B is a diagrammatical illustration of one embodiment of a sheet of an absorbent material for a makeup remover mask.

FIGS. 2A and 2B are representative examples of one of the two sheets of absorbent material for the makeup remover mask. FIGS. 2A and 2B show representative examples of a sheet of absorbent material having a periphery with a concave section.

Referring to FIG. 2A, a sheet 200 of an absorbent material for one component of the makeup remover mask is illustrated. The sheet 200 of an absorbent material has a width and length greater than the thickness, so as to be easy flexible. The sheet 200 of an absorbent material has a periphery 204 including a concave section 202. The periphery of the sheet 200 of an absorbent material that is not part of the concave section 202 can assume any shape. In an embodiment, the periphery of the sheet 200 of an absorbent material that is not part of the concave section 202 has straight edges, thus defining a part of a rectangle. In other embodiments, the periphery of the sheet 200 of an absorbent material that is not part of the concave section 202 can assume other shapes, including multiple straight edges and curves. In an embodiment, the periphery of the sheet 200 of an absorbent material that is not part of the concave section 202 is not limiting.

Referring to FIG. 2B, a sheet 210 of an absorbent material for one component of the makeup remover mask is illustrated. The sheet 210 of an absorbent material has a width and length greater than the thickness, so as to be easy flexible. The sheet 210 of an absorbent material has a periphery 214 including a first concave section 212 and a second concave section 216 that is located on the opposite side from the first concave section 212. Having two concave sections 212 and 216 allows the sheet 210 to be used multiple times, for example, twice as much as a sheet only having one concave section. The periphery of the sheet 210 of an absorbent material that is not part of the concave sections 212 and 216 can assume any shape. In an embodiment, the periphery of the sheet 210 of an absorbent material that is not part of the concave sections 212 and 216 has straight edges, thus, defining a part of a rectangle. In other embodiments, the periphery of the sheet 210 of an absorbent material that is not part of the concave sections 212 and 216 can assume other shapes, including multiple straight edges and curves. In an embodiment, the periphery of the sheet 210 of an absorbent material that is not part of the concave sections 212 and 216 is not limiting.

Figure 3:
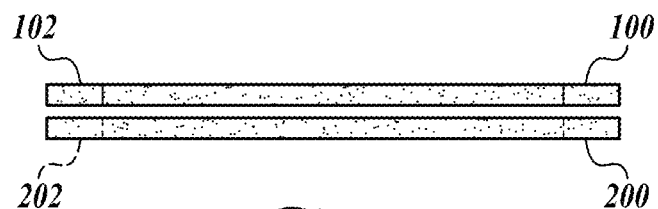
FIG. 3 is a diagrammatical illustration of one embodiment of a makeup remover mask having a first and second sheet of an absorbent material.
Figure 4:
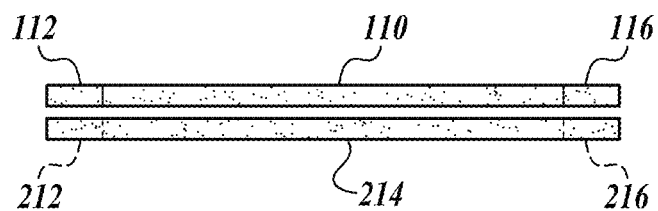
FIG. 4 is a diagrammatical illustration of one embodiment of a makeup remover mask having a first and second sheet of an absorbent material.
Figure 6:
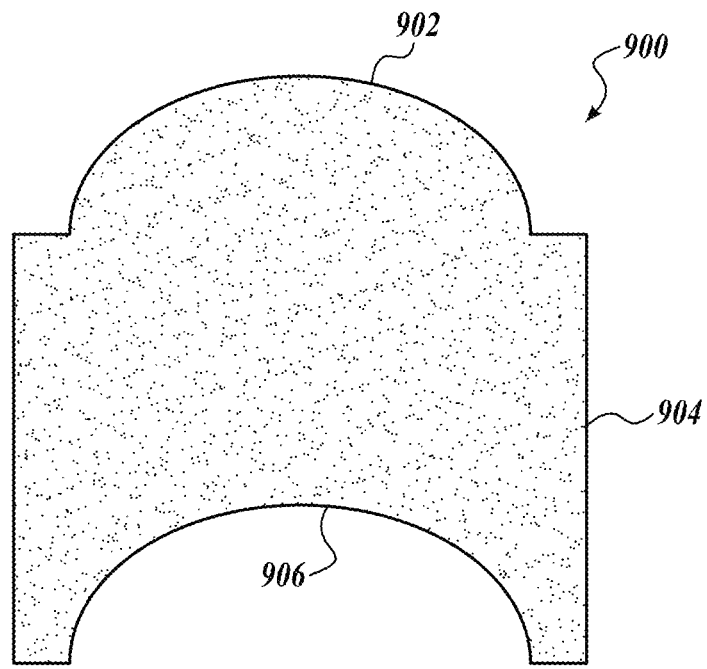
FIG. 6 is a diagrammatical illustration of one embodiment of a sheet of an absorbent material for a makeup remover mask.

As described, a makeup remover mask includes a first sheet of an absorbent material with a concave section on the periphery and a second sheet of an absorbent material with a convex section on the periphery. In an embodiment, for example, the sheet 100 of FIG. 1A can be combined with the sheet 200 of FIG. 2A (as shown in FIG. 3) in a stacked arrangement for packaging and retail sale to be used as the makeup remover mask. In an embodiment, multiple pairs of sheet 100 and sheet 200 are stored in a container. In an embodiment, for example, the sheet 110 of FIG. 1B can be combined with the sheet 210 of FIG. 2B (as shown in FIG. 4) in a stacked arrangement for packaging and retail sale to be used as the makeup remover mask. In an embodiment, multiple pairs of sheet 110 and sheet 210 are stored in a container. However, the foregoing is not limiting, for example, the sheet 100 of FIG. 1A can be combined with the sheet 210 of FIG. 2B, or the sheet 110 of FIG. 2A can be combined with the sheet 200 of FIG. 2A. Then, multiples of pairs of sheets, alternating between one sheet having a convex section and one sheet having a concave section, can be stacked in a container 700 as shown in FIG. 6 for retail sale.

Figure 5:
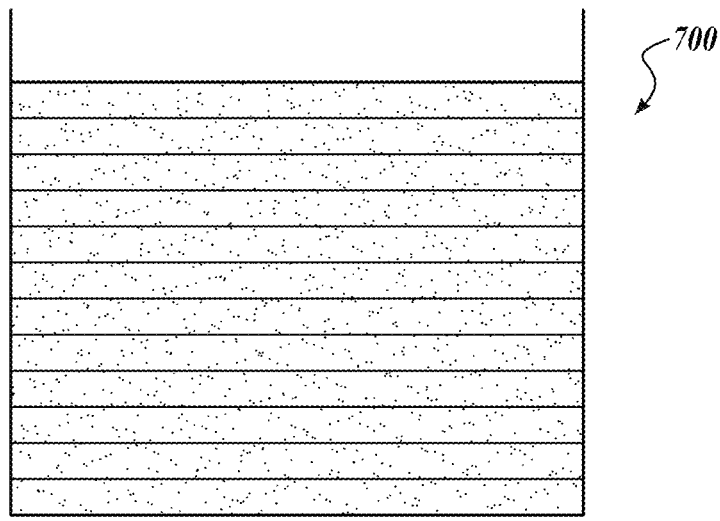
FIG. 5 is a diagrammatical illustration of one embodiment of a container holding a plurality of sheets of an absorbent material for use in a makeup remover mask.

In an embodiment, the sheets in container 700 of FIG. 5 are dry. That is, the sheets are not pre-wetted with a makeup remover solvent. This allows the consumer to select the makeup remover solvent. In another embodiment, the sheets in container 700 of FIG. 5 are pre-wetted, and are saturated with a makeup remover solvent. The makeup remover solvent is not limiting.

Figure 7:
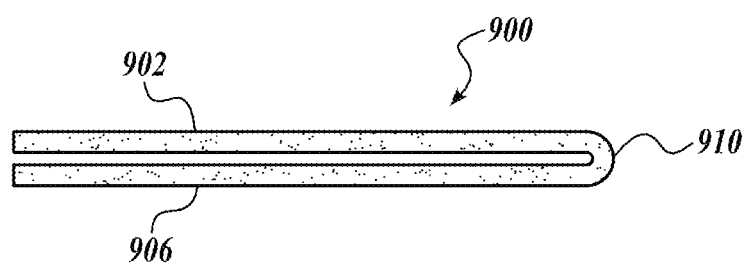
FIG. 7 is a diagrammatical illustration of one embodiment of a sheet of an absorbent material for a makeup remover mask.

In an embodiment, the makeup remover mask includes a first sheet of an absorbent material with a concave section and a second sheet of an absorbent material with a convex section, wherein the first sheet and the second sheet are physically separate sheets. Also, in an embodiment, a makeup remover mask includes a first sheet of an absorbent material with a concave section and a second sheet of an absorbent material with a convex section, wherein the first sheet has a different shape from the second sheet. However, in an embodiment, a makeup remover mask can begin as single sheet of an absorbent material having a periphery with both a concave section and a convex section. In FIG. 6, a sheet 900 of an absorbent material has a periphery 904 that includes both a convex section 902 and a concave section 906. The part of the periphery of the sheet 900 that is not the convex section 902 or the concave section 906 has straight edges. In an embodiment, a makeup remover mask includes a first sheet 900 using the convex section 902 and a second similar sheet 900 using the concave section 906. Therefore, a makeup remover mask can have two sheets that are the same shape. Furthermore, a makeup remover mask can begin as a single sheet, for example, sheet 900 of FIG. 6, which tears easily into two sheets. Thus, if the sheet 900 is torn or cut in the middle, a first sheet is produced having the concave section 906 and a second sheet is produced having the convex section 902. In an embodiment, the sheet 900 can include perforations, a bend, or a thinning of material in a line to allow tearing the sheet 900 into the two sheets of the makeup remover mask. FIG. 7 shows an example of a single sheet 900 of an absorbent material that includes a convex section 902 and a concave section 906 and a thinning of material at the bend 910 that allows tearing into two sheets, one half-sheet having the convex section 902 and one half-sheet having the concave section 906.

Figure 8:
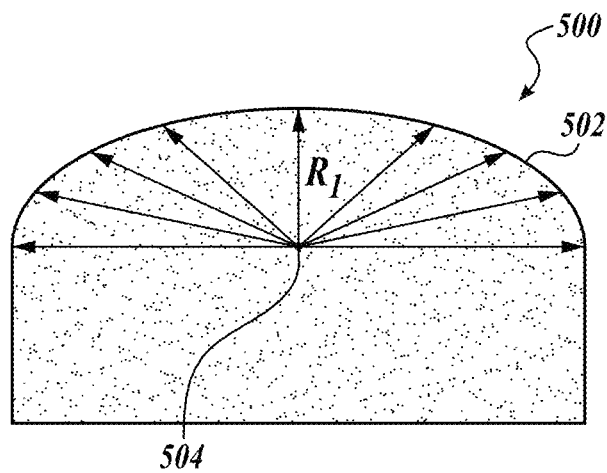
FIG. 8 is a diagrammatical illustration of one embodiment of a sheet of an absorbent material for a makeup remover mask.

Thus far, embodiments of sheets of an absorbent material are described having a periphery that includes at least one concave section, one convex section, or a combination of a convex section and a concave section. Referring to FIG. 8, a convex section 502 is further defined in one embodiment with respect to a locus or point 504. In an embodiment, the locus 504 of a convex section 502 for any embodiment of a sheet of absorbent material is located inside the periphery of the respective sheet. In FIG. 8, the locus 504 is located within the periphery of the sheet 500. Sheet 500 is used to represent any sheet described as having a periphery with a convex section. The convex section 502 is defined by a radius, $R_1$. The radius $R_1$ can be constant as it sweeps the arc of the convex section 502, thus, defining an arc of a circle. Alternatively, the radius $R_1$ varies in length as it sweeps the arc of the convex section 502, thus, defining an arc of an ellipse. In an embodiment, the arc of the convex section 502 can be so flat that the locus 504 has to lie outside of the periphery to define the radius $R_1$; however, in such case the locus 504 is in a location where the radius $R_1$ still passes at least partly through the sheet. However, convex sections used in the sheets described herein do not need to conform to a definition of a circle or ellipse, and include other curves.

Figure 9:
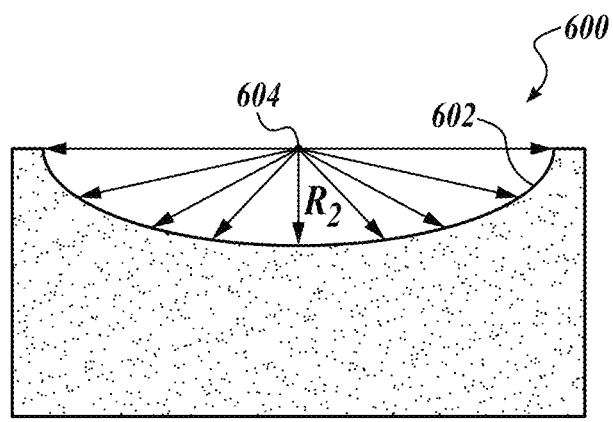
FIG. 9 is a diagrammatical illustration of one embodiment of a sheet of an absorbent material for a makeup remover mask.

Referring to FIG. 9, a concave section 602 is further defined in one embodiment with respect to a locus or point 604. In an embodiment, the locus 604 of a concave section 602 for any embodiment of a sheet of absorbent material is located outside of the periphery. In FIG. 9, the locus 604 is located outside the periphery of the sheet 600. In an embodiment, the arc of the concave section 602 can be so flat that the locus 604 has to lie far away from the concave section 602 to define the radius $R_2$; however, in such case the locus 604 is in a location where the radius $R_2$ still does not pass through the sheet, and the radius $R_2$ lies entirely outside the periphery. Sheet 600 is used to represent any sheet described as having a periphery with a concave section. The concave section 602 is defined by a radius, $R_2$. The radius $R_2$ can be constant as it sweeps the arc of the concave section 602, thus, defining an arc of a circle. Alternatively, the radius $R_2$ varies in length as it sweeps the arc of the concave section 602, thus, defining an arc of an ellipse. However, concave sections used in the sheets described herein do not need to conform to a definition of a circle or ellipse, and include other curves.

In an embodiment, for example, both the convex section 502 of FIG. 8, and the concave section 602 of FIG. 9 are cut or shaped to correspond with eye shape.

While the use of the radii in FIGS. 8 and 9 are one way to define the convex and concave sections, in another embodiment, one can sample and measure a plurality of different eye shapes and derive a composite shape that will best fit the plurality of eye shapes. Based on the derived composite shape, both the convex section 502 of FIG. 8, and the concave section 602 of FIG. 9 are cut or shaped to correspond with the derived best overall shape.

In an embodiment, the sheets of an absorbent material shown in FIGS. 1 to 13 are made cotton, wood pulp, cellulose, or a combination thereof.

In an embodiment, the sheets of an absorbent material shown in FIGS. 1 to 13 include one or more plies. For example, sheets of an absorbent material shown in FIGS. 1 to 13 are single-ply, double-ply, or have greater than two plies. A sheet of an absorbent material that includes two or more plies may use the same material for each ply or use a different material for each ply. For example, in one embodiment, a double ply sheet includes a ply of an absorbent material and a ply of an impermeable material.

Figure 10:
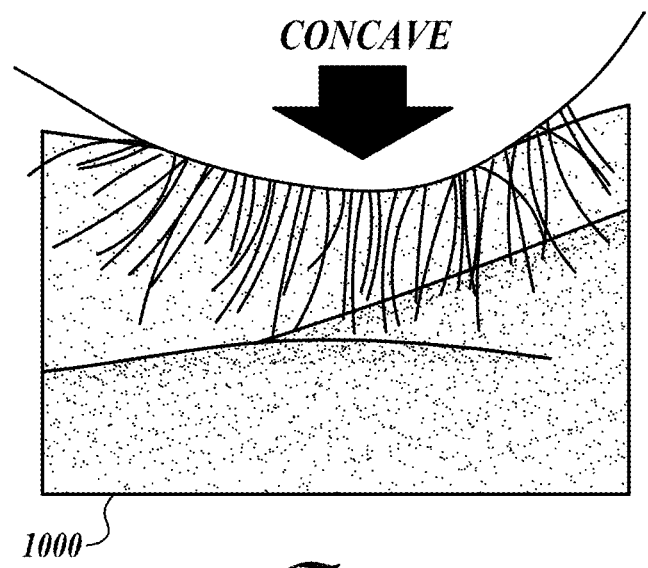
FIG. 10 is a diagrammatical illustration of a step of a method for removing eye makeup using a sheet of an absorbent material as a makeup remover mask.

FIG. 10 illustrates an embodiment of using the sheet of absorbent material having a periphery with a concave section as a makeup remover mask by placing the absorbent sheet having a concave section below and facing the eye and underneath the eyelid and lashes.

Figure 11:
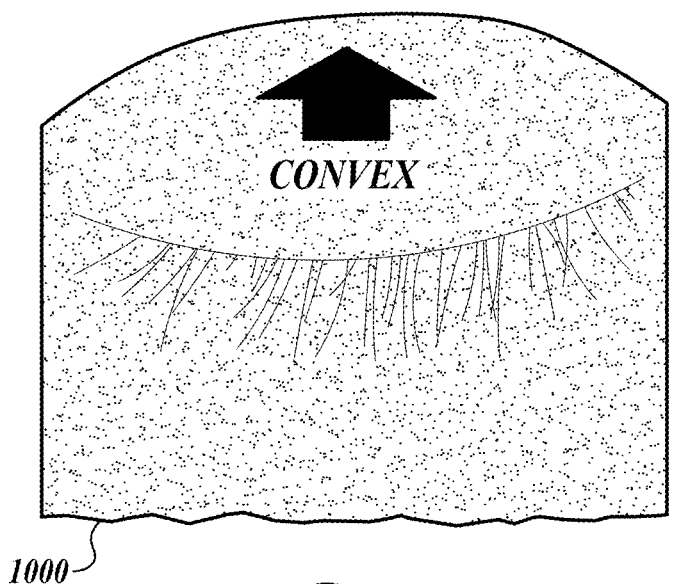
FIG. 11 is a diagrammatical illustration of a step of a method for removing eye makeup using a sheet of an absorbent material as a makeup remover mask.

FIG. 11 illustrates an embodiment of using the sheet of absorbent material having a periphery with a convex section as a makeup remover mask by placing the absorbent sheet having a convex section facing the eye and over the eyelid to cover the eyelid and lashes.

The order of placing the sheets is not limiting. In an embodiment, the sheet having the convex section is placed first, as described, followed by placing the sheet having the concave section.

In an embodiment, before placing the sheets as described, the sheets are wetted with a makeup remover solvent. After placing the wetted sheets in the respective eye locations, the sheets are used to massage the area to remove the makeup, such as eyeliner, eyeshadow, mascara, and the like.

EXAMPLE

An invention example using an embodiment of a makeup remover mask including a first sheet with a concave section and a second sheet with a convex section is compared to a comparative example using a convention cotton sheet.

Figure 12A:
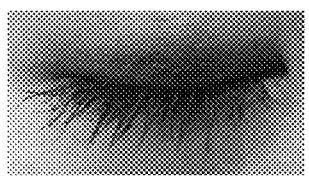
FIG. 12A is a photo of an eye with eye makeup including mascara and eyeshadow for use in an invention example.
Figure 13A:
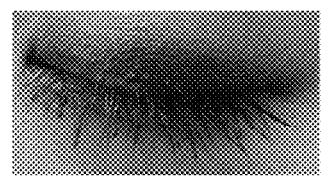
FIG. 13A is a photo of an eye with eye makeup including mascara and eyeshadow for use in a comparative example.
Figure 12B:
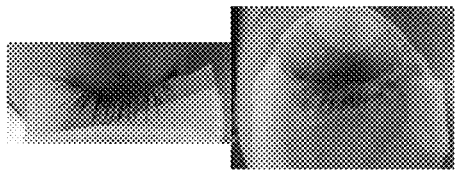
FIG. 12B is a photo of placing a first sheet with a concave section on the lower eye lid and placing a second sheet with a convex section on the upper eye lid in the invention example.
Figure 13B:
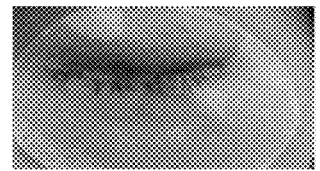
FIG. 13B is a photo of placing a conventional cotton sheet over the eye in the comparative example.

Mascara and eye shadow are applied to the left (invention example) and right eye (comparative example). FIG. 12A is a photo of the left eye with eye makeup including mascara and eye shadow for use in the invention example. FIG. 13A is a photo of the right eye with eye makeup including mascara and eye shadow for use in the comparative example. Next, in the invention example, a first sheet having a periphery with a concave section is applied in the area under the eye, and a second sheet having a periphery with a convex section is applied to the upper eyelid covering the mascara and eyeshadow. FIG. 12B is a photo of placing a first sheet with a concave section on the area below the eye and placing a second sheet with a convex section on the upper eye lid in the invention example. In the comparative example, FIG. 13B is a photo of placing a single elliptical cotton sheet over the upper eye lid. The elliptical cotton sheet is seen to be large enough to extend to the area under the eye, but the sheet is not underneath the eyelashes. Next, the eye lid and lashes are massaged using both the second sheet with a convex section in the invention example and the conventional cotton sheet in the comparative example.

Figure 12C:
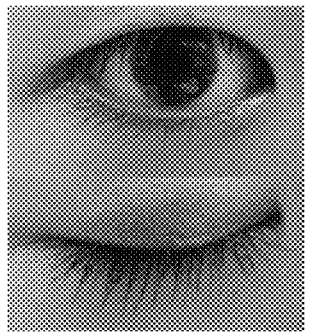
FIG. 12C is a photo of the eye after removing eye makeup using the eye makeup remover mask in the invention example.
Figure 13C:
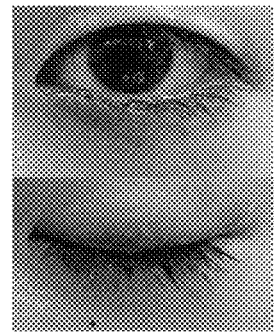
FIG. 13C is a photo of the eye after removing eye makeup using the conventional cotton sheet in the comparative example.

The results are compared. FIG. 12C is a photo of the left eye after removing eye makeup using the eye makeup remover mask in the invention example. FIG. 13C is a photo of the right eye after removing eye makeup using the conventional cotton sheet in the comparative example. Residue is still visible under the right eye of the comparative example.

Figure 12D:
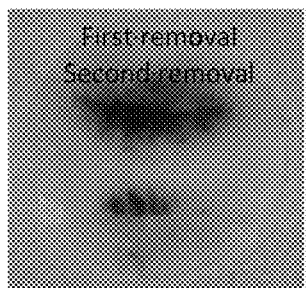
FIG. 12D is a photo of the sheet of an absorbent material after removing the eye makeup used in the invention example.
Figure 13D:
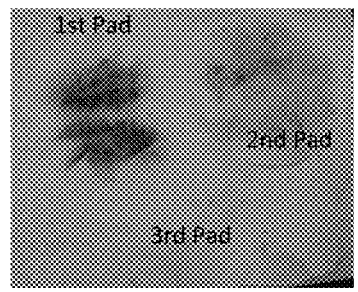
FIG. 13D is a photo of the conventional cotton sheet after removing the eye makeup used in the comparative example.

Next, the sheet of the invention example is compared to the sheets of the comparative example. FIG. 12D is a photo of the sheet of an absorbent material after removing the eye makeup used in an invention example. FIG. 13D is a photo of the conventional cotton sheet after removing the eye makeup used in the comparative example. In the invention example, the removal step was repeated twice using the same mask. In the comparative example, three removal steps were performed requiring three conventional cotton pads.

Advantages of using the remover mask of the invention include the avoidance of transferring eye makeup from the upper eye lid to the lower eye area, thus, avoiding cleaning of the area under the eye, reducing skin damage of the area under the eye, the sheets can be recycled, and by increasing removal efficient, less sheets will be used.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for removing eye makeup, comprising:
    providing a makeup remover mask, the makeup remover mask includes:
        a first sheet of an absorbent material, the first sheet is defined by a first periphery including four sides, two opposite first and second straight edges form two sides of the first periphery and a concave edge between the two opposite first and second straight edges forms a third side of the first periphery, a fourth side of the first periphery is opposite from the concave edge, wherein an entire exterior of the makeup remover mask has a uniform composition across length, width, and thickness; and
        a second sheet of an absorbent material, the second sheet is defined by a second periphery including four sides, two opposite third and fourth straight edges form two sides of the second periphery and a convex edge between the two opposite third and fourth straight edges forms a third side of the second periphery, a fourth side of the second periphery is opposite from the concave edge, wherein the first sheet and the second sheet are stacked upon each other, wherein the first sheet and the second sheet are joined and can be separated, wherein the fourth side of the first sheet is joined to the fourth side of the second sheet at a line including perforations, a bend of material, or a thinning of material, wherein the first sheet is separable from the second sheet, wherein the line joining the fourth side of the first sheet and the fourth side of the second sheet is straight;
    separating the first sheet from the second sheet of the makeup remover mask;
    placing the concave edge of the first sheet on a lower eye lid of an eye beneath eyelashes, wherein the concave edge is juxtaposed on the lower eye lid; and
    placing the convex edge of the second sheet on an upper eye lid of an eye, wherein the convex edge is juxtaposed on the upper eye lid.

2. The method of claim 1, wherein the first sheet and the second sheet include a solvent.

3. A makeup remover mask, comprising:
    a first sheet of an absorbent material, the first sheet is defined by a first periphery including four sides, two opposite first and second straight edges form two sides of the first periphery and a concave edge between the two opposite first and second straight edges forms a third side of the first periphery, a fourth side of the first periphery is opposite from the concave edge, wherein an entire exterior of the makeup remover mask has a uniform composition across length, width, and thickness; and
    a second sheet of an absorbent material, the second sheet is defined by a second periphery including four sides, two opposite third and fourth straight edges form two sides of the second periphery and a convex edge between the two opposite third and fourth straight edges forms a third side of the second periphery, a fourth side of the second periphery is opposite from the concave edge, wherein the first sheet and the second sheet are stacked upon each other, wherein the first sheet and the second sheet are joined and can be separated, wherein the fourth side of the first sheet is joined to the fourth side of the second sheet at a line including perforations, a bend of material, or a thinning of material, wherein the first sheet is separable from the second sheet, wherein the line joining the fourth side of the first sheet and the fourth side of the second sheet is straight.

4. A container, comprising multiple pairs of the first sheet and the second sheet of the makeup remover mask of claim 3.

5. The container of claim 4, further comprising a makeup remover solvent absorbed on the first sheet and the second sheet.

\* \* \* \* \*